T. J. SMITH.
CULTIVATOR ATTACHMENT FOR COTTON CHOPPERS.
APPLICATION FILED DEC. 26, 1908.
924,288.
Patented June 8, 1909.
2 SHEETS—SHEET 1.
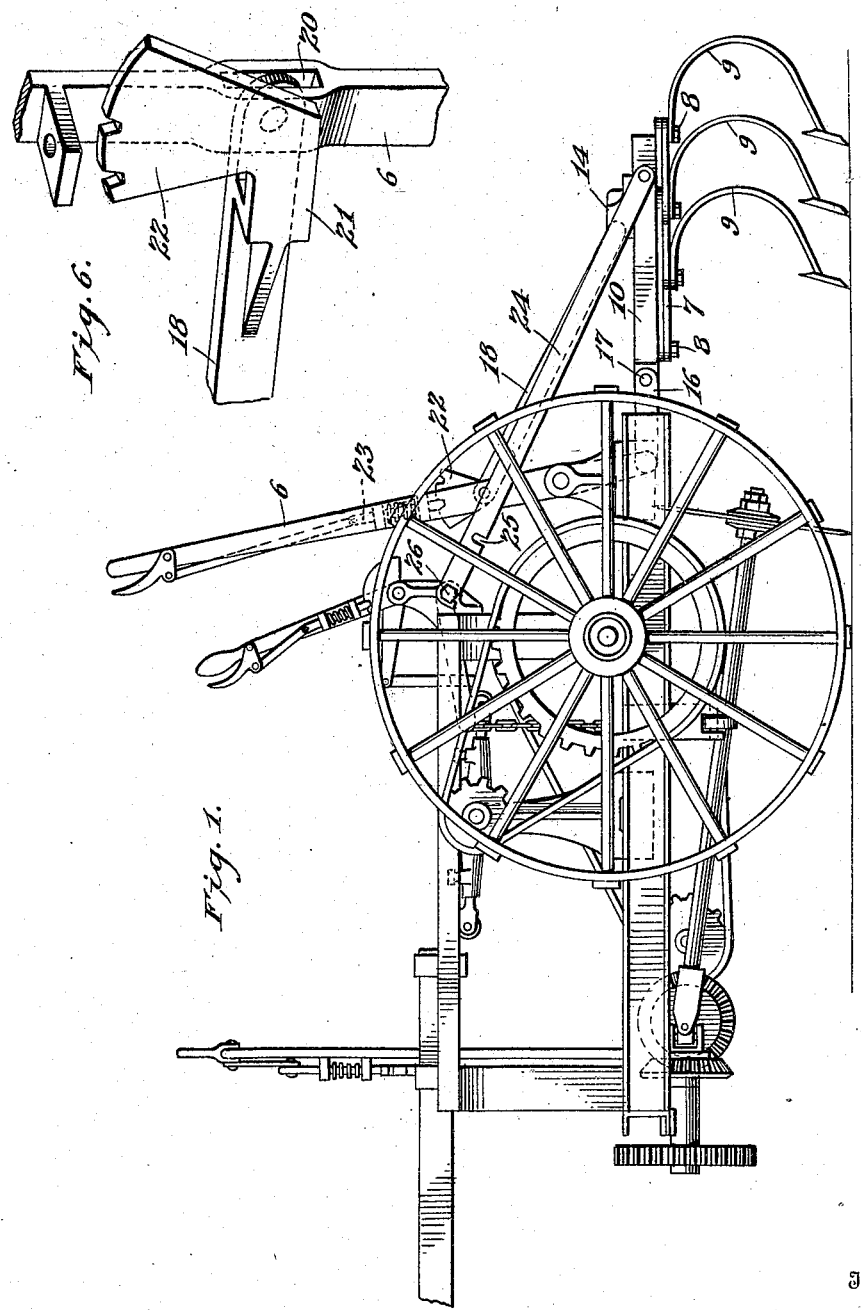
Witnesses
M. C. Lyddane
J. D. L. Mulhall.
Inventor
Taylor J. Smith
By Joshua R. H. Potts
Attorney T. J. SMITH.
CULTIVATOR ATTACHMENT FOR COTTON CHOPPERS.
APPLICATION FILED DEC. 26, 1908.
924,288.
Patented June 8, 1909.
2 SHEETS—SHEET 2.
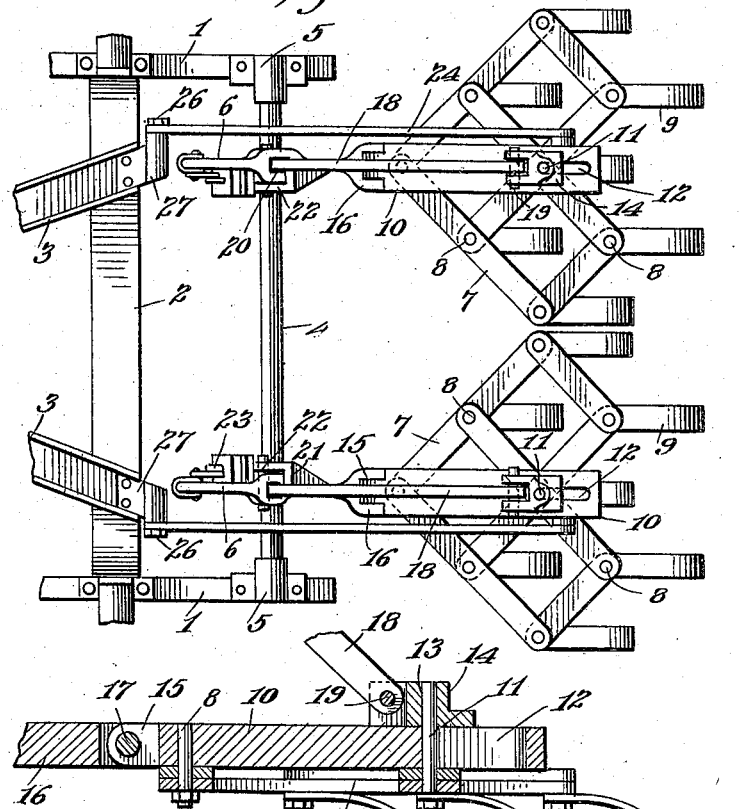
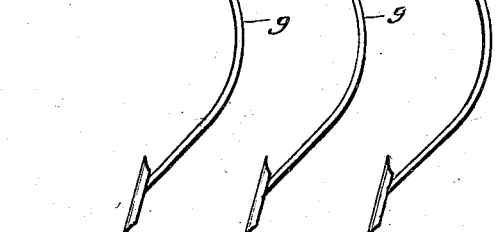
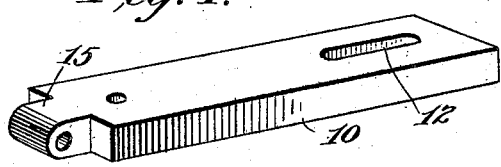
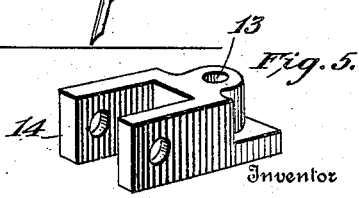
Witnesses
M. C. Lyddane
J. D. L. Mulhall
Inventor
Taylor J. Smith
By Joshua R. N. Potts
Attorney

UNITED STATES PATENT OFFICE.

TAYLOR J. SMITH, OF BIRMINGHAM, ALABAMA.

CULTIVATOR ATTACHMENT FOR COTTON-CHOPPERS.

No. 924,288.                Specification of Letters Patent.              Patented June 8, 1909.

Application filed December 26, 1908. Serial No. 469,194.

*To all whom it may concern:*

Be it known that I, TAYLOR J. SMITH, a citizen of the United States, residing at Birmingham, in the county of Jefferson and State of Alabama, have invented certain new and useful Improvements in Cultivator Attachments for Cotton-Choppers, of which the following is a specification.

My invention relates to an improved cultivator and more particularly designed for use with my improved cotton chopper set forth in an application for patent executed on even date herewith.

The object of the invention is to provide twin cultivators of improved construction and mounting which enables the cultivators to be contracted and extended transversely, to cover the desired space of ground on opposite sides of a row of cotton.

A further object is to provide improved lazy tong frames for the cultivators with spring teeth secured at the pivot points of the frame, and provide improved lever and link connections between the frame and a support, so as to adjust the width of the cultivators by manipulating the lever.

A further object is to provide improvements of this character with improved means for supporting the cultivators in an elevated position out of contact with the ground, to enable the cultivator to be moved without the teeth of the cultivator coming into engagement with the ground.

With these and other objects in view the invention consists in certain novel features of construction, and combinations, and arrangements of parts as will be more fully hereinafter described and pointed out in the claims.

In the accompanying drawings, Figure 1, is a view in side elevation illustrating one application of my improved cultivator in connection with a cotton chopper. Fig. 2, is a top plan view showing the connection of the cultivators with the rear end of the cotton chopper frame. Fig. 3, is a view in longitudinal section through the center of one of the cultivator frames. Fig. 4, is a detail perspective view of the bar 10. Fig. 5, is a similar view of the block 14, and Fig. 6, is a fragmentary perspective view showing the connection between the link 18 and the lever 6.

1, 1 represent the side bars of my cotton chopper, 2 the rear arch connecting the bars 1, and 3, 3, longitudinal bars secured upon the arch 2. A cross rod 4 is secured in brackets 5 on bars 1, and levers 6 are fulcrumed between their ends on the said bar 4, the levers 6 being spaced apart and adjacent to the respective side bars 1 of the cotton chopper frame.

7, 7 represent the lazy tong frames of my improved twin cultivators, the frames comprising a series of links connected by pivot pins or bolts 8, and the latter also serving to secure spring teeth 9 to the under face of the cultivator frames.

The construction and operation of both of the twin cultivators are exactly alike, and the herein description of one, it will be understood, applies alike to both.

A longitudinal bar 10 is located centrally on the frame 7, and the foremost pivot bolt 8 is secured in an opening in said bar, and the pivot bolt 11 at the center of the frame, projects up through an elongated slot 12 in said bar, and is secured in an opening 13 in a block 14, the latter mounted to slide upon bar 10. The forward end of bar 10 is made with a lug 15 disposed within the forked rear end of link 16, and pivotally secured thereto by a pin 17. The forward end of link 16 is pivotally secured to the lower end of lever 6, so that the manipulation of the lever 6 serves to move the bar 10 longitudinally.

The block 14 above referred to is bifurcated as shown, and a link 18 is pivotally secured in the bifurcated portion of the block by a pin 19, and is pivotally secured at its other end in a slot 20 in lever 6. This link 18 adjacent to lever 6, is made with an integral offset portion 21, having a notched segment 22 thereon, located beside the lever 6, and in the path of a spring pressed detent 23 carried by the lever, to lock the lever and the link 18 against independent movement.

A supporting link 24 is pivotally secured at one end to one side of bar 10, and at its other end is provided with two or more notches 25 to engage over studs 26 secured in brackets 27 at the rear ends of bars 3, as shown in Fig. 1, to hold the cultivator frames down in operative position, or which can be moved to the second notch 25 and support the cultivators in elevated position. The hinged connection between the bar 8 and the link 16, and the hinge connection between the link 16 and the lower end of lever 6 permits the frames to swing upward and dispose the cultivator teeth out of contact with the ground.

As shown in Figs. 1, 2 and 3, the cultivator frames are extended to their widest formation which leaves but slight space between the adjacent inner ends of the cultivator frames to accommodate the cotton row. When the lever 6 is moved rearward or to the right in Fig. 1, the lower end of the lever will draw the bar 10 forward or to the left in Fig. 1, and the link 18 will move the block 14 to the rear, and by reason of these opposite movements of the bar 10, and the block 14, to which are connected the forward pivot bolt 8 and the central pivot bolt 11 respectively, the lazy tong frames 7 will be caused to contract laterally, and can be adjusted to the size desired. When properly adjusted the spring pressed detent 23 on lever 6 is released and will enter a notch in segment 22 and secure the frame at the proper adjustment. It will thus be observed that by manipulating the lever 6, the width of the frames can be adjusted to suit conditions, and while I have shown but two notches in the segment 22, it will be understood that as many notches may be employed as desired, so that the cultivator frames can be adjusted to suit any and all conditions. These cultivators move along the ground at both sides of the cotton row and cut the ground, burying the cotton chopped out by the choppers in front, and at a single operation perform what now usually requires two separate and distinct operations.

While I have illustrated and described my improved cultivator in connection with a cotton chopper, this invention is not limited to a cotton chopper, but may be used with other devices, only requiring a support for the lever 23 and the link 24, which support may be a cotton chopper or other movable support.

Slight changes might be made in the general form and arrangement of parts described without departing from my invention and hence I do not restrict myself to the precise details set forth, but consider myself at liberty to make such changes and alterations as fairly fall within the spirit and scope of my invention.

Having thus described my invention what I claim as new and desired to secure by Letters Patent is:

1. The combination of twin cultivators, lazy tong frames on the cultivators comprising links connected by pivot bolts, levers fulcrumed between their ends, and devices connecting the levers above and below their fulcrums with different pivot bolts on the cultivator frames, so that the movement of the levers will move said pivot pins toward or away from each other to contract or lengthen the cultivator frames transversely.

2. The combination with twin cultivators, a movable support, and hinged connection between the support and the cultivators, of links pivotally secured at their rear ends to the cultivators and having a series of notches at their forward ends, and lugs or studs on the support adapted to enter said notches and support the cultivator frames in an operative or elevated position.

3. The combination with a cultivator frame comprising a series of crossed links, pivot bolts connecting the links, and teeth on said frame, a longitudinal bar located centrally on the frame and connected to one of said pivot bolts, a block mounted to slide on said bar, another of said pivot bolts located in a slot in the bar and secured in said block, a lever fulcrumed between its ends, a link connecting the lower end of the lever with said bar, and a link connecting said block with said lever above the fulcrum of the latter.

4. The combination with a cultivator frame comprising a series of crossed links, pivot bolts connecting the links, and teeth on said frame, a longitudinal bar located centrally on the frame and connected to one of said pivot bolts, a block mounted to slide on said bar, another of said pivot bolts located in a slot in the bar and secured in said block, a lever fulcrumed between its ends, a link connecting the lower end of the lever with said bar, a link connecting said block with said lever above the fulcrum of the latter, a notched segment on said last mentioned link, and a spring pressed detent on said lever to engage said link.

5. The combination with a lazy tong frame comprising crossed links and pivot bolts connecting links, of spring teeth secured to the lower ends of said pivot bolts, a longitudinal bar located centrally on the frame and connected with one of said pivot bolts, and said bar having a longitudinal slot therein, a block mounted to slide on said bar, a pivot bolt projecting up through the slotted bar and secured to said block, a lever fulcrumed between its ends, a link connecting the lower end of the lever with the forward end of said bar, a link connecting the block with the said lever above the fulcrum of the latter and located in a slot in the lever, an offset portion on said link, a notched segment on said offset portion located on one side of the lever, and a spring pressed detent on said lever engaging the notched segment.

In testimony whereof I have signed my name to this specification in the presence of two subscribing witnesses.

TAYLOR J. SMITH.

Witnesses:
M. O. ALEXANDER,
J. A. FITCH.